Inventor
HAROLD E. BALSIGER
By
Hugh N Rocks
Attorney

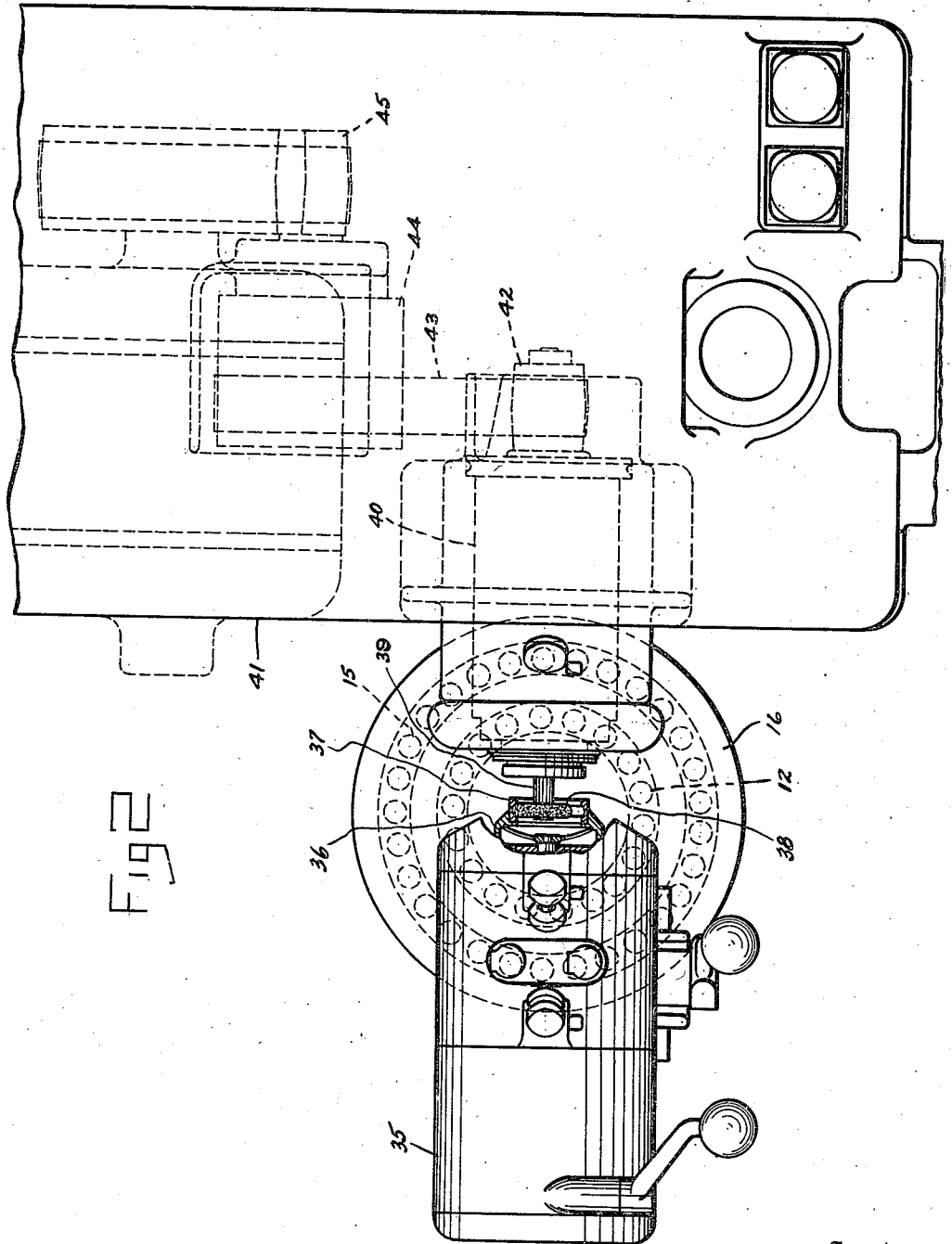

Patented May 5, 1942

2,281,658

UNITED STATES PATENT OFFICE 2,281,658

BEARING ARRANGEMENT

Harold E. Balsiger, Waynesboro, Pa., assignor to Landis Tool Company, Waynesboro, Pa.

Application August 1, 1940, Serial No. 349,035

3 Claims. (Cl. 51—97)

This invention relates to anti-friction bearing application, particularly where it is important that the bearings be placed as close as possible to the point of application of the load thereon.

An object of this invention is to provide a bearing arrangement wherein two sets of bearings are disposed in substantially the same plane at right angles to the axis of the spindle supported by one of said bearings.

A further object is to provide an annular portion on the spindle housing such that a bearing member may be inserted therein and another slipped over the outer surface thereof.

If the bearings on this device were arranged according to conventional methods, the bearing 15 would be approximately the same size and would be mounted on the spindle between the point of application of the load and the bearing 12 which would be supported in the housing 10. The bearing 15 would carry only the weight of the headstock and support or the thrust load. The bearing 12 would carry the radial load but it would be so far spaced from the point of application of the load, that is, the point of contact between the wheel 38 and ball race 37, that there might be sufficient deflection in the spindle as to have an objectionable effect on the surface being ground. This invention overcomes any such difficulty by making use of a bearing 15, larger than bearing 12, and disposing it in circumscribing relation thereto. Both bearings are then located as near as possible to the point of application of the load. Advancing the bearing 12 has the effect of increasing the rigidity of the spindle mounting and thus reducing the error which might enter into the grinding of a ball race due to deflection of the oscillating spindle.

In the drawings:

Figure 2 is a partial plan view of a ball race grinder to which this invention is applied for the purpose of this application.

Figure 1:
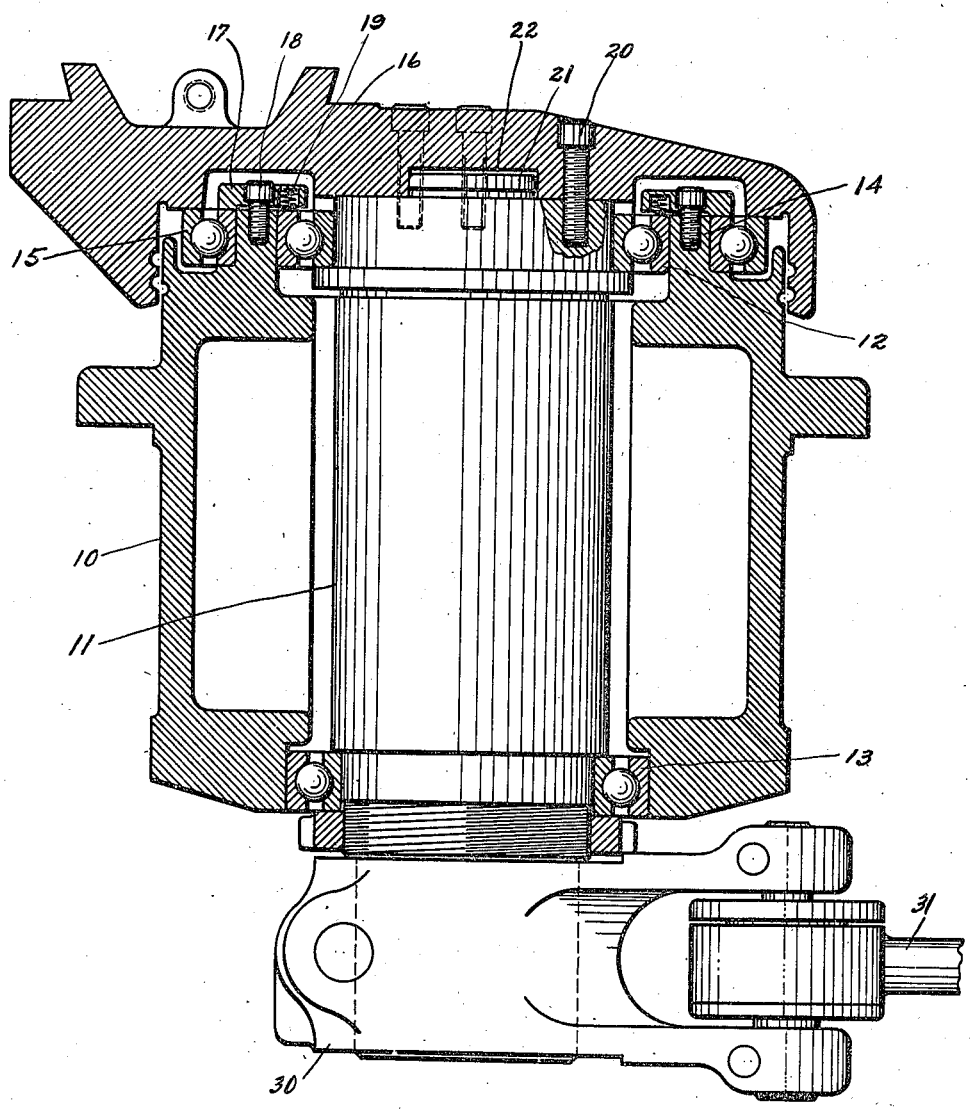
Figure 1 is a sectional front elevation showing the novel arrangement of anti-friction bearings.

Reference numeral 10 indicates a portion of the bed of a ball race grinder which houses the oscillating spindle 11. Said spindle is supported in spaced bearings 12 and 13 in said housing. Bearing 12 is inserted in an annular protrusion 14 in the upper portion of said housing. A third bearing 15 is mounted on the outside of said protruding portion and a headstock support 16 rests on the outer race of said bearing. A ring 17 is secured to said annular portion by screws 18. The outer portion of said ring engages the inner race of bearing 15. A series of springs 19 inserted at spaced intervals about the inner portion of said ring engage the outer race of bearing 12 and provide a preload for said bearing. Headstock support 16 is secured to spindle 11 by means of screws 20. A pilot 21 on said spindle fits into a recess 22 in support 16 to center said support relative to said spindle. At the lower end of spindle 11 is attached a bracket 30 which is connected to an oscillating device thru rod 31.

In Figure 2 is shown a partial plan view of a ball race grinder. A headstock 35 is mounted on the support 16. A chuck 36 rotatably mounted in said headstock holds a ball race 37. A grinding wheel 38 is shown in contact with the groove of said race. Said wheel is secured to a spindle 39 rotatably mounted in a housing 40 on wheel base 41. A pulley 42 on the end of said spindle is driven thru a belt 43 by a pulley 44 on a jack shaft. Another pulley 45 on said jack shaft is driven by a motor and belt, now shown. The radial load on spindle 11 is due to the horizontal force exerted by the wheel on the work.

The operation of this invention should be obvious from the preceding portion of the specification, and for this reason further description is deemed unnecessary.

I claim:

1. In a metal working machine, a spindle housing having an extended annular portion thereon, a bearing mounted within said portion, a spindle supported in said bearing, another bearing mounted independently of said first mentioned bearing on the outside of said annular portion, a member supported thereon, said bearings being disposed in substantially the same axial position.

2. In a metal working machine, a spindle housing having an extended annular portion thereon, a bearing mounted within said portion, a spindle supported in said bearing, another bearing mounted independently of said first mentioned bearing on the outside of said annular portion, a member supported thereon, said bearings being disposed substantially in a plane at right angles to the axis of rotation of the spindle.

3. In a metal working machine, an oscillating spindle, a work support mounted thereon and having a substantially large overhang from said spindle, means for rotatably supporting a work piece on said support, a tool support movable toward and from operative relation with said work support, a housing for said spindle, an annular portion of said housing having an internal and an external surface, a bearing member in said annular portion for receiving the radial thrust on said spindle, and another bearing on said portion in circumscribing relation thereto and to said first mentioned bearing for carrying the overhanging weight of said work support.

HAROLD E. BALSIGER.